March 23, 1926.

J. C. HICKINGBOTHAM

BEVERAGE CONTAINER

Filed Nov. 19, 1924

1,577,969

INVENTOR
Joseph C. Hickingbotham
BY
White Prost Evans
his ATTORNEYS

Patented Mar. 23, 1926.

1,577,969

UNITED STATES PATENT OFFICE.

JOSEPH C. HICKINGBOTHAM, OF SAN FRANCISCO, CALIFORNIA, ASSIGNOR TO SHREVE & COMPANY, OF SAN FRANCISCO, CALIFORNIA, A CORPORATION OF CALIFORNIA.

BEVERAGE CONTAINER.

Application filed November 19, 1924. Serial No. 750,754.

*To all whom it may concern:*

Be it known that I, JOSEPH C. HICKINGBOTHAM, a citizen of the United States, and a resident of the city and county of San Francisco, State of California, have invented a new and useful Beverage Container, of which the following is a specification.

The invention relates to portable beverage containers for holding beverage to be dispensed to one or more persons.

An object of the invention is to provide a beverage container constructed to contain a plurality of cups, in which the beverage may be dispensed.

Another object of the invention is to provide a beverage container having a cup pocket therein which may be closed to retain the cup in the pocket.

A further object of the invention is to provide a beverage container having a pouring aperture and a cup pocket and being provided with means for simultaneously opening or closing the pouring aperture and the cup pocket.

The invention possesses other advantageous features, some of which with the foregoing, will be set forth at length in the following description, where I shall outline in full that form of the invention which I have selected for illustration in the drawings accompanying and forming part of the present specification. In said drawings I have shown one form of beverage container embodying my invention, but it is to be understood that I do not limit myself to such form, since the invention, as set forth in the claims, may be embodied in a plurality of forms.

Referring to said drawings.

Figure 1:
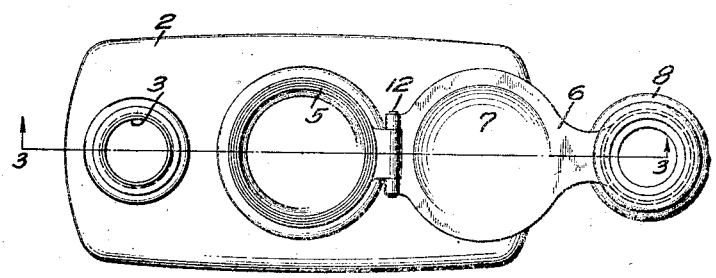
Figure 1 is a top view of the beverage container of my invention showing the pouring aperture and the cup pocket open.
Figure 2:
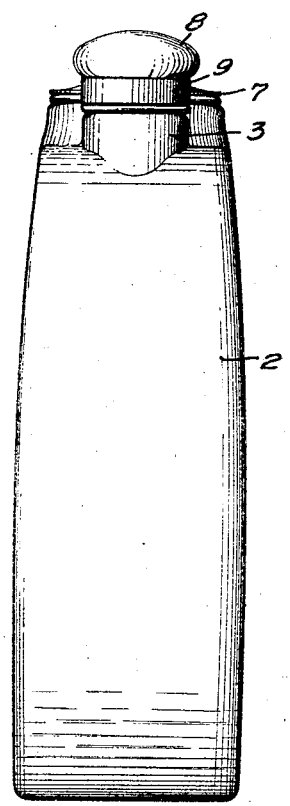
Figure 2 is a side elevation of the beverage container of my invention, showing the cup pocket and the pouring aperture closed.
Figure 3:
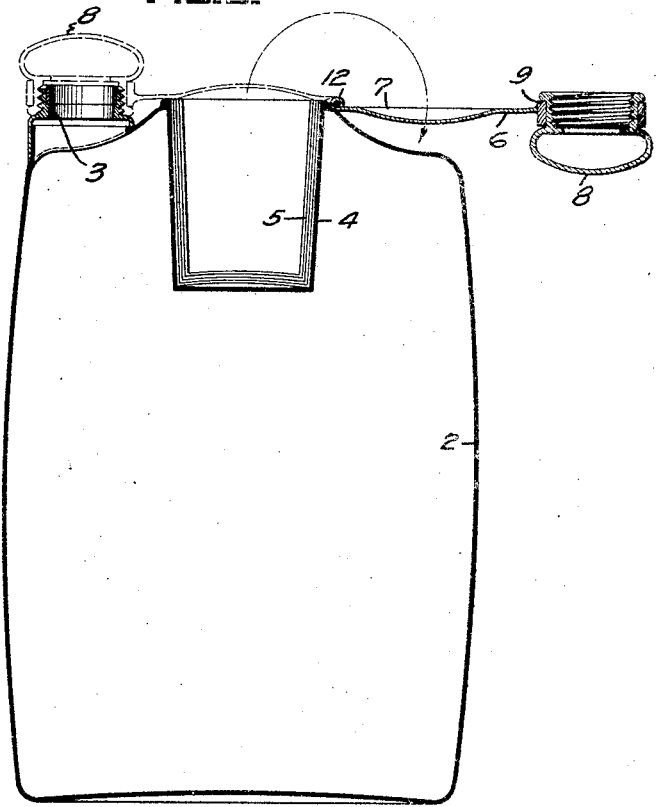
Figure 3 is a vertical section through the container taken on the line 3—3 Figure 1.

The beverage container of my invention comprises a receptacle having a pouring aperture through which the beverage may be introduced into or discharged from the receptacle. The container is also provided with a pocket extending into the container and adapted to receive one or more cups, which may be removed from the pocket and used for dispensing the beverage. The invention also contemplates means for closing the pocket to retain the cups therein and further contemplates the combination of the pocket closure with the aperture closure so that when the aperture is closed, the pocket is also closed and may not be opened until the aperture is opened.

The container comprises a receptacle 2 made of suitable metal such as silver or of a base metal plated with silver, gold or nickle, or other metal which will not be deleteriously affected by the beverage contained within the receptacle. The receptacle is provided with a pouring aperture, this aperture in the present instance comprising a screw threaded spout 3 through which the beverage is introduced into or dispensed from the receptacle. Extending into the receptacle, preferably adjacent the pouring aperture 3, is a pocket or cup 4, preferably made of the same metal as the receptacle and having imperforate walls, so that there is no communication between the interior of the pocket and the interior of the receptacle. The pocket is soldered or welded or otherwise secured to the wall of the receptacle at its open end, so that the pocket opens on the exterior surface of the receptacle. The pocket is adapted to contain one or more cups 5 and in the drawing I have shown 4 nested cups 5 disposed in the pocket. The upper edges of the cup are disposed below or substantially flush with the upper edge of the pocket.

Means are provided for closing the pocket to retain the cups therein. Pivoted to the receptacle adjacent the pocket 4 is a closure member 6 having a widened portion 7 adapted, when the closure member is properly positioned, to overlie and close the pocket 4 to prevent the release of the cups therefrom. The closure member 6 also preferably carries the stopple for the pouring aperture 3, the stopple in the present instance comprising a screw threaded cap 8 rotatably mounted in the closure member 6, so that the cap may be screwed onto or off of the spout 3. The closure member 6 is provided at its outer end with a circular collar 9 in which the cap 8 is carried, so that it may be readily rotated. Normally, with the cap screwed onto the spout 3, the closure member 6 overlies and closes the pocket 4. When it is desired to dispense beverage from the container, the cap 8 is unscrewed from the spout 3 and the closure member 6 is moved about its hinge 12 to open the pocket to permit the removal of the cups therefrom. The container may be made in various designs and of various metals and the cups are preferably made of the same metal as the container, so that the device may be ornamental as well as highly useful.

I claim:

1. A beverage container comprising a receptacle having a threaded pouring aperture, a pocket extending into the receptacle and adapted to contain a cup, a pocket closure member attached to the receptacle and a screw threaded stopple for the aperture rotatably mounted in said closure member.

2. A beverage container comprising a receptacle having a threaded pouring aperture, a pocket extending into the receptacle adjacent the aperture, a plurality of nested cups in the pocket, a pocket closure member hinged to the receptacle and a screw threaded stopple for the aperture rotatably mounted in the closure member.

3. A beverage container comprising a receptacle having a pouring aperture, a pocket extending into the receptacle and adapted to contain a cup, a pocket closure member attached to the receptacle, and a stopple for the aperture carried by said closure member, closing of the aperture by the stopple serving to fix the closure member in position over the pocket.

4. A beverage container comprising a receptacle having a pouring aperture, a pocket extending into the receptacle adjacent the pouring aperture and adapted to contain a cup, a strap hinged to the receptacle on the side of the pocket remote from the aperture, and a stopple for the aperture mounted in said strap whereby sealing of the aperture by the stopple positions said strap over the pocket to retain the cup therein.

5. A beverage container comprising a receptacle having a pouring aperture, a pocket extending into the receptacle and adapted to contain a cup, a pocket closure member hinged to the receptacle and adapted in closed position to overlie said pocket and in open position to be clear of said pocket, and a stopple for said pouring aperture rotatably mounted on said pocket closure member, whereby closure of said pouring aperture by said stopple causes said pocket closure member to assume its closed position.

6. A beverage container comprising two noncommunicating receptacles provided with adjacent apertures, unitary operating means affixed to said container for simultaneously closing said apertures, and means on said container cooperating with said closing means for retaining said closing means in closed position.

In testimony whereof, I have hereunto set my hand.

JOSEPH C. HICKINGBOTHAM.